US011500828B1

(12) United States Patent
Yu

(10) Patent No.: US 11,500,828 B1
(45) Date of Patent: Nov. 15, 2022

(54) METHOD AND DEVICE FOR CONSTRUCTING DATABASE MODEL WITH ID-BASED DATA INDEXING-ENABLED DATA ACCESSING

(71) Applicant: X-Times Design Automation Co., LTD, Shanghai (CN)

(72) Inventor: Miao Yu, Shanghai (CN)

(73) Assignee: X-Times Design Automation Co., LTD, Shanghai (CN)

( * ) Notice: Subject to any disclaimer, the term of this patent is extended or adjusted under 35 U.S.C. 154(b) by 0 days.

(21) Appl. No.: 17/588,235

(22) Filed: Jan. 29, 2022

(30) Foreign Application Priority Data

Sep. 18, 2021 (CN) .......................... 202111096626.3

(51) Int. Cl.
*G06F 16/21* (2019.01)
*G06F 16/22* (2019.01)

(52) U.S. Cl.
CPC ........ *G06F 16/211* (2019.01); *G06F 16/2228* (2019.01)

(58) Field of Classification Search
CPC ........................... G06F 16/2228; G06F 16/211
USPC ......................................................... 707/803
See application file for complete search history.

(56) References Cited

U.S. PATENT DOCUMENTS

| 5,812,850 A | 9/1998 | Wimble | |
| 6,598,037 B1* | 7/2003 | Craig ................... | G06F 16/289 707/999.001 |
| 2004/0122827 A1 | 6/2004 | Cazemier | |
| 2021/0089552 A1* | 3/2021 | Karl ....................... | G06F 16/27 |

FOREIGN PATENT DOCUMENTS

| CN | 104303162 A | 1/2015 |
| CN | 104781810 A | 7/2015 |
| CN | 106104514 A | 11/2016 |
| CN | 112148736 A | 12/2020 |
| CN | 112241325 A | 1/2021 |
| CN | 113342908 A | 9/2021 |
| WO | 2012117438 A1 | 9/2012 |

OTHER PUBLICATIONS

First Office Action issued in counterpart Chinese Patent Application No. 202111096626.3, dated Nov. 10, 2021.

* cited by examiner

*Primary Examiner* — Robert W Beausoliel, Jr.
*Assistant Examiner* — Arthur Ganger
(74) *Attorney, Agent, or Firm* — Westbridge IP LLC

(57) ABSTRACT

Disclosed are a method and a device for constructing database model with ID-Based data indexing-enabled data accessing, applied to EDA software, comprising: in the creation stage of the database, assigning an ID to each data object, and creating corresponding ID Wrappers for different types of data objects respectively; a corresponding ID is stored in the ID Wrapper, and the ID is used for identifying the indexed data object, and the method of accessing the corresponding data object is software-encoded in the ID Wrapper; in the use stage of the database, each calculation module of the EDA software generates a data access requirement in the running process of the EDA software; directly using a corresponding ID Wrapper to access the corresponding data object; and executing a data access instruction written based on the programming rule in the ID Wrapper to access a desired data object.

20 Claims, 9 Drawing Sheets

Memory Space

| | |
|---|---|
| Place calculation module | |
| instA : (id 0) | address = 20+ 8xid = 20 + 8x0 = 20 |
| instB : (id 1) | address = 20+ 8xid = 20 + 8x1 = 28 |
| instC : (·····) | |
| instD : (·····) | |
| ····· | |
| instX : (·····) | |
| NetA : (id 0) | address = 56+ 3xid = 56 + 3x0 = 56 |
| NetC : (id 2) | address = 56+ 3xid = 56 + 3x2 = 62 |

| | |
|---|---|
| instA (id=0) | |
| direction : left | |
| location : (11, 8) | |
| Pin-A1 : (id 0) | address = 38 + 4xid = 38 + 4x0 = 38 |
| Pin-A2 : (·····) | |
| ····· | |
| area : 230.5 | |

| | |
|---|---|
| instB (id=1) | |
| direction : right | |
| location : (3, 3) | |
| Pin-B1 : (id 2) | address = 38 + 4xid = 38 + 4x2 = 46 |
| Pin-B2 : (·····) | |
| ····· | |
| area : 100.2 | |

| |
|---|
| Pin-A1 (id=0) |
| direction : east |
| location : (1, 1) |
| ····· |

| |
|---|
| Pin-B1 (id=2) |
| direction : south |
| location : (2, 2) |
| ····· |

FIG. 5B

METHOD AND DEVICE FOR CONSTRUCTING DATABASE MODEL WITH ID-BASED DATA INDEXING-ENABLED DATA ACCESSING

CROSS-REFERENCE TO RELATED APPLICATIONS

The application claims priority to Chinese Patent Application No. 202111096626.3, filed on Sep. 18, 2021, the entire contents of which are incorporated herein by reference.

TECHNICAL FIELD

The present application relates to the field of database technology in the electronic design automation (EDA) domain, in particular to a method and a device for constructing database model with ID-Based data indexing-enabled data accessing.

BACKGROUND

With the continuous development of the very-large-scale integration (VLSI) design technology, EDA software need to process more and more data (in the order of millions to billions of logical gates), with higher and higher computational density.

In a typical EDA database, data is constructed, stored and accessed in the form of "data objects". Each data object is itself constructed recursively with simpler data objects (representing the various attributes of that data object). In general, a data object represents some physical entity of the VLSI design, while a data attribute represents some property of that physical entity. In most cases, the data attribute itself is also a data object.

The whole database system of an EDA software could be viewed as an exhaustive description and representation of the interested structural and property details of the VLSI design. Different data objects, depending on their structural complexity, typically occupy memory resources ranging from a few bytes to a few megabytes. The number of data objects needed for a design, as estimated through the total number of logical gates, is typically in the order of millions to billions. Data references are widely used in the database for referring to the corresponding data object entities when expressing their relationships. In most cases, the "reference" of a data object is actually the value of the memory address (memory pointer) of that data object. The reference itself, as one kind of data object, only occupies a few bytes of memory resources (depending on the computer hardware platform). Compared with copying the whole data object entity, the pointer-based reference approach saves lots of database memory and is widely adopted in the field for long.

Typically, each data object has only one copy stored in the memory, but a large number of references in the database. All these data object entities and their mutual reference form an extremely complex, high-density, high-dimensional data network. All the EDA computation commands are performed based on such a complex data network. Different computation commands, according to their complexities, typically take periods from several milliseconds to several weeks. The whole electronic design cycle, as a multiple-stage combination of both automatic commands and manual operations, takes periods from several weeks to several years.

SUMMARY

The present application proposes a method and a device for constructing database model with ID-Based data indexing-enabled data accessing.

In the first aspect of the present application, it provides a method for constructing database model with ID-Based data indexing-enabled data accessing for EDA software, as described in detail below:

During database construction, we assign an ID value for each data object, and create a corresponding ID-wrapper for that data object. The correspondence between the ID value and the data object is stored in an ID-mapper as an ID-array. The ID-wrapper is used as a reference to the original data object, which can be copied and stored directly in the data user's own memory. The ID-wrapper is responsible for holding the ID value of the original data object. Besides, the ID-wrapper encapsulates the methods to access the original data object through the ID-mapper. The encapsulated methods are: if the original data object belongs to type one, we transform the ID value to the memory address (the data pointer that is pointed to the original data object) through the ID-mapper, and then access the data object through that data pointer; if the original data object belongs to type two or type three, we acquire the original data object directly through the ID value in the ID-mapper. The contained elements of the ID-mapper are either memory pointers or small data objects, which occupies small memories. As such, it is possible to construct the ID-mapper in a consecutive memory space, avoiding the performance penalty caused by memory space segmentation.

Upon database usage, when a sub-module of the EDA software needs to access data in the database, it accesses directly through the ID-wrapper that is stored in its own memory. Several underlying operations are performed inside the ID-wrapper: it executes the encapsulated methods to access the original data objects through its contained ID value; then return the resulting data to the caller.

In the second aspect of the present application, it provides a computer device comprised of one or more processors, memories; and one or more programs, wherein the one or more programs are stored in the memory and are executed by the one or more processors, and the program includes instructions for executing the method according to the first aspect.

In the third aspect of the present application, it provides a non-volatile computer-readable storage software solution comprising a computer program that, when executed by one or more processors, causes the processor to execute the method according to the first aspect.

In the fourth aspect of the present application, it provides a computer program product comprising a computer program instruction that, when executed on a computer, causes the computer to execute the method according to the first aspect.

BRIEF DESCRIPTION OF DRAWINGS

To illustrate the technical solution more clearly in the present application or the technical solution in the related art, a brief description of the accompanying drawings in the embodiments or the prior art will be given below. Obviously, the accompanying drawings described below are only embodiments described in this application. For those of ordinary skill in the art, other drawings can also be obtained from these drawings without any creative labor.

FIG. 5B illustrates a schematic diagram of an ID-based data access approach of OpenDB according to an embodiment of the present application.

DETAILED DESCRIPTION OF THE EXAMPLES

To explain the purposes, technical solutions and advantages of the present application more clearly, hereinafter the present application will be further described in detail in combination with the specific embodiments and the accompanying drawings.

It should be noted that unless otherwise defined, technical or scientific terms used in the embodiment of the present application shall be of the general meaning understood by those ordinarily skilled in the field to which the present application belongs. The words "first", "second", and the like as used in the embodiment of the present application are not intended to denote any order, number, or importance, but merely to distinguish between different components. A similar word "comprising" or "including" or the like means that an component or an object appearing before the word covers the component or the object listed at the end of the word and its equivalents and does not exclude other component or object. The words "connection" or "connected," and the like, are not limited to physical or mechanical connections, but may include electrical connections, whether direct or indirect. The "upper", "lower", "left", "right", and the like are used to only indicate the relative positional relationship, and when the absolute position of the described object is changed, the relative position relationship may also be changed accordingly.

Figure 1:
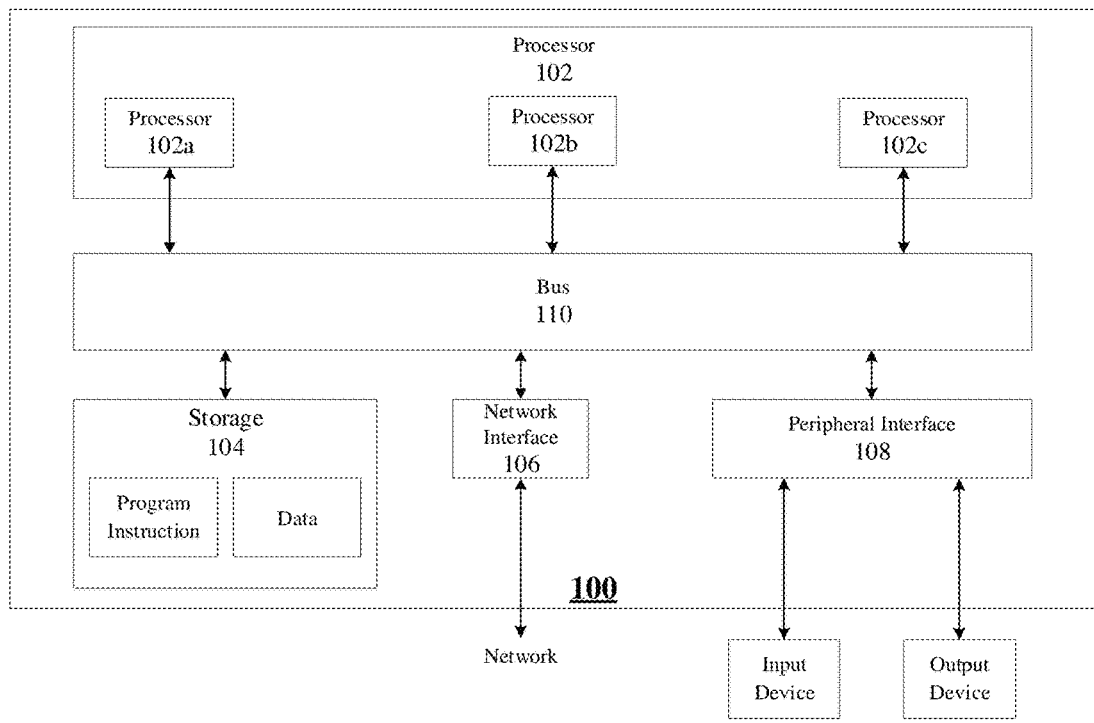
FIG. 1 illustrates a schematic structural diagram of an electronic device provided in an embodiment of the present application.

FIG. 1 is a schematic structural diagram of an electronic device 100 provided in an embodiment of the present application. The electronic device 100 may be, for example, a computer host. The electronic device 100 may include a processor 102, a storage 104, a network interface 106, a peripheral interface 108, and a bus 110. The processor 102, the storage 104, the network interface 106 and the peripheral interface 108 realize communication connection with each other within the device via the bus 110.

The processor 102 may be a central processing unit (CPU), an image processor, a neural network processor (NPU), a microcontroller (MCU), a programmable logic device, a digital signal processor (DSP), an application specific integrated circuit (ASIC) or one or more integrated circuits. The processor 102 may be operable to perform functions related to the techniques described herein. In some embodiments, the processor 102 may also include multiple processors that are integrated into a single logical component. As shown in FIG. 1, the processor 102 may include a plurality of processors 102a, 102b, and 102c.

The storage 104 may be configured to store data (e.g., an instruction set, a computer code, intermediate data, etc.). For example, as shown in FIG. 1, the stored data may include program instructions (e.g., program instructions for implementing the technical solution of the present application) as well as data to be processed (e.g., the storage 104 may store temporary code generated during the compilation process). The processor 102 may also access stored program instructions and data and execute the program instructions to operate on the data to be processed. The storage 104 may include volatile storage devices or non-volatile storage devices. In some embodiments, the storage 104 may include a random access memory (RAM), a read-only memory (ROM), an optical disk, a magnetic disk, a hard disk, a solid-state disk (SSD), a flash memory, a memory stick, and the like.

The network interface 106 may be configured to provide communication with other external devices to the electronic device 100 via the network. The network may be any wired or wireless network capable of transmitting and receiving data. For example, the network may be a wired network, a local wireless network (e.g., Bluetooth, WiFi, Near Field Communication (NFC), etc.), a cellular network, the Internet, or a combination thereof. It will be appreciated that the network type is not limited to the specific examples described above. In some embodiments, the network interface 106 may include any combination of any number of network interface controllers (NIC), radio-frequency modules, transceivers, modems, routers, gateways, adapters, cellular network chips, and the like.

The peripheral interface 108 may be configured to connect the electronic device 100 to one or more peripheral devices to enable information input and output. For example, the peripheral devices may include input devices such as a keyboard, a mouse, a touchpad, a touch screen, a microphone, various types of sensors or the like, and output devices such a display, a speaker, a vibrator, an indicator light, or the like.

The bus 110 may be configured to transfer information between various components (such as the processor 102, the storage 104, the network interface 106, and the peripheral interface 108) of the electronic device 100, such as an internal bus (e.g., a processor-memory bus), an external bus (a USB port, a PCI-E bus), or the like.

It should be noted that although the above-described device only shows the processor 102, the storage 104, the network interface 106, the peripheral interface 108, and the bus 110, in a specific implementation, the device may also include other components necessary to enable normal operation. Moreover, it will be understood by those skilled in the art that the above-described device may also include only the components necessary for implementing the solution of the embodiment of the present application, rather than all the components shown in the drawings.

Figure 2A:
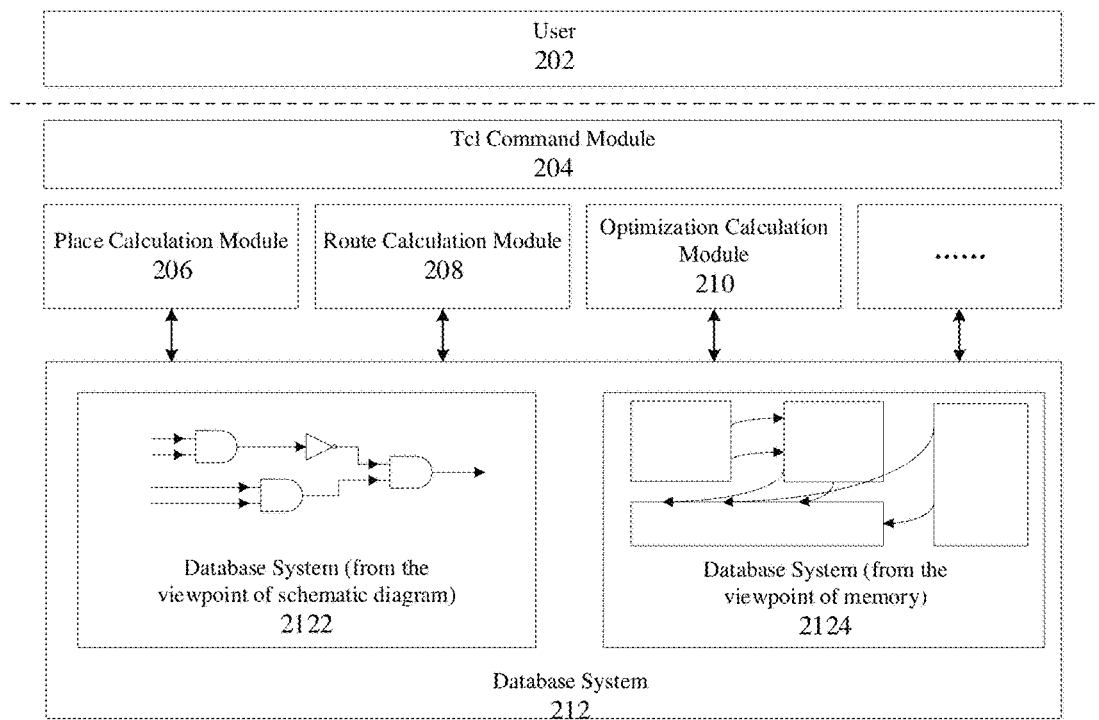
FIG. 2A illustrates a basic schematic structural diagram of a simulation tool according to an embodiment of the present application.

FIG. 2A shows a basic schematic structural diagram of a simulation tool 200 according to an embodiment of the present application.

As shown in FIG. 2A, the user portion is above the dashed line, and the simulation tool 200, which may be implemented by the device 100 shown in the FIG. 1, is below the dashed line. The simulation tool 200 may include a Tcl command (or a graphics/window interface) module 204, various calculation modules (e.g., a Place calculation module 206, a Route calculation module 208, an Optimization calculation module 210, etc.), and a database system 212. User 202 may operate the simulation tool 200 by entering relevant commands in the Tcl command (or the graphics/window interface) module 204. In some embodiments, the simulation tool 200 may be any EDA (Electronic Design Automation) software.

The Tcl command module 204 mainly plays the function of message passing or command passing. The Tcl command module 204 may read the instructions input by user 202 to the simulation tool 200, and may distribute and transfer the instructions to the corresponding calculation modules to perform specific tasks according to the specific contents of the instructions.

According to different calculation tasks, each calculation module may be divided into, for example, a Place calculation module 206, a Route calculation module 208, and an Optimization calculation module 210. The Place calculation module 206 may be configured to calculate reasonable placement positions for all components. The Route calculation module 208 may be configured to calculate a reasonable wire connection between the components. The Optimization calculation module 210 may be configured to optimize the placement position and the wire connection mode of the components. The calculation process of these calculation modules may be performed, for example, in the processor 102 of FIG. 1.

The database system 212 may be used to completely and roundly record and store all information (such as location, direction, size, structure, wire connection, etc.) of the simulated or designed chip, for example, in the storage 104 of FIG. 1.

Figure 2B:
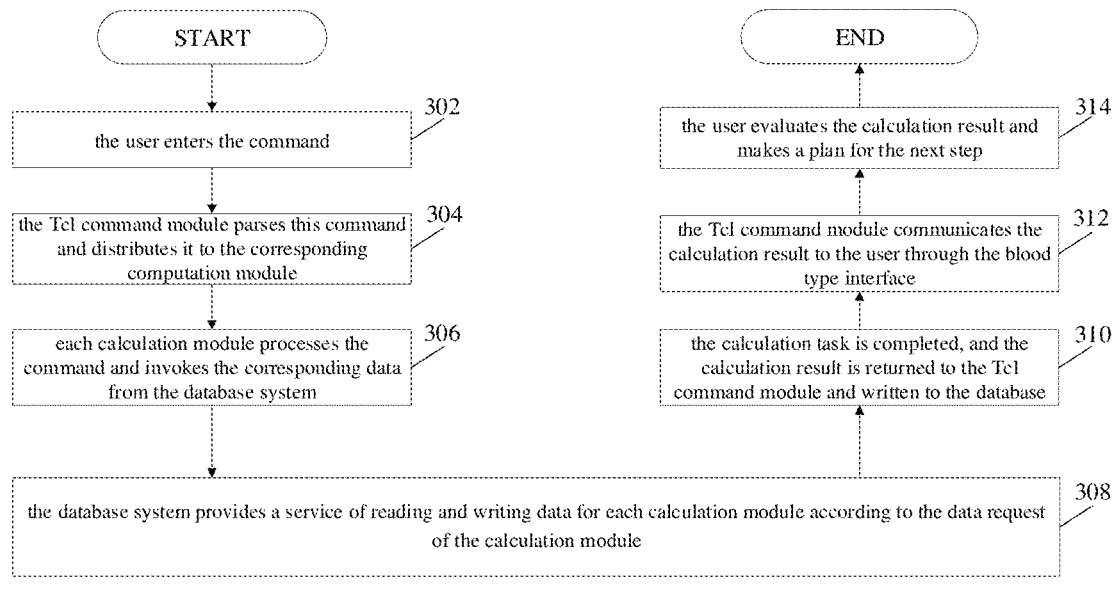
FIG. 2B illustrates a basic execution flow of a calculation command of the simulation tool according to an embodiment of the present application.

FIG. 2B shows a basic execution flow of a calculation command of the simulation tool 200 according to an embodiment of the present application. As shown in FIG. 2B, in step 302, the user 202 may issue a command (e.g., a do_place command) to the simulation tool 200 via a command-line interface or a graphical interface provided by the Tcl command module 204, and then in step 304, the Tcl command module 204 parses this command and distributes it to the corresponding calculation module (e.g., the Place calculation module 206). In step 306, each calculation module performs a specific calculation that it needs to perform. In the meantime, as shown in step 308, each calculation module needs to (frequently and repeatedly) retrieve the data in the database system 212 to perform the calculation. After the calculation is completed, as shown in step 310, each calculation module may write the calculation result into the database system 212, and return the calculation result to the Tcl command module 204. In step 312, the Tcl command module 204 returns the calculation result to user 202 via a command-line interface or a graphical interface, and the processing of a calculation command by the simulation tool 200 ends. In step 314, the user may perform an evaluation based on the calculation result and then determine the next plan.

It can be seen that during the processing of a calculation command by the simulation tool 200, in the process of executing the computing task, each calculation module may intensively read the data from the database system 212 or write new data to the DB system 212, at a high frequency.

The data information stored in the database system 212 is shown in module 2122 in FIG. 2A. For example, the Place calculation module 206 itself does not store the data information of the chip directly, but reads the orientation information of all components as well as the interconnection between these components from the database system 212. During and after the calculation, the Place calculation module 206 may write new orientation information of the corresponding components to the database system 212. The database system 212 cooperates with each calculation module to accomplish the tasks specified by the user.

From the memory perspective, the basic form of data access of each calculation module from the database system 212 is shown in module 2124 in FIG. 2A. The data of the simulated or designed chip is divided into a plurality of independent and complete data blocks according to their types, and is stored dispersedly in different memory blocks (corresponding to different memory locations). If two data objects are on different memory blocks and need to contain each other because of a logical relationship, they can be specified in the form of a "memory address/pointer" when reading data.

The typical process of accessing a data object and its attribute through the traditional pointer mode is generally divided into the following steps.

First, upon data loading, the database creates all the data objects, stores them in the memory, and uses the address (pointer) of each data object in memory as the data reference of the data object. Here, all the data objects created by the database may be stored in the memory of the storage 104 of the device 100 in FIG. 1, or may be stored in the memory of a cloud device. When the data objects are stored in the cloud, the simulation tool 200 can use the data in the database by remote invoking.

Then, the database user (the party using the data in the database, for example, the developer of sub-modules of the simulation tool 200) stores the data pointer obtained from the database in its own temporary storage area (e.g., the storage 104 in FIG. 1) as a reference to its data. When it is necessary to access a certain data object, the pointer of the data object is obtained from the temporary storage area (the value of the pointer is the memory address of the data object, and the data object itself can be accessed directly through the pointer). When it is necessary to access an attribute object, it is practicable to access the value or pointer of the attribute object of the data object by invoking a custom command on the data object. If the value of the attribute object is obtained, the accessing process ends. If the pointer of the attribute object is obtained, it is necessary to further invoke the custom command of the attribute object to access its internal sub-attribute object (value or pointer). This recursive invocation process continues until the value of the required attribute is accessed.

Figure 2C:
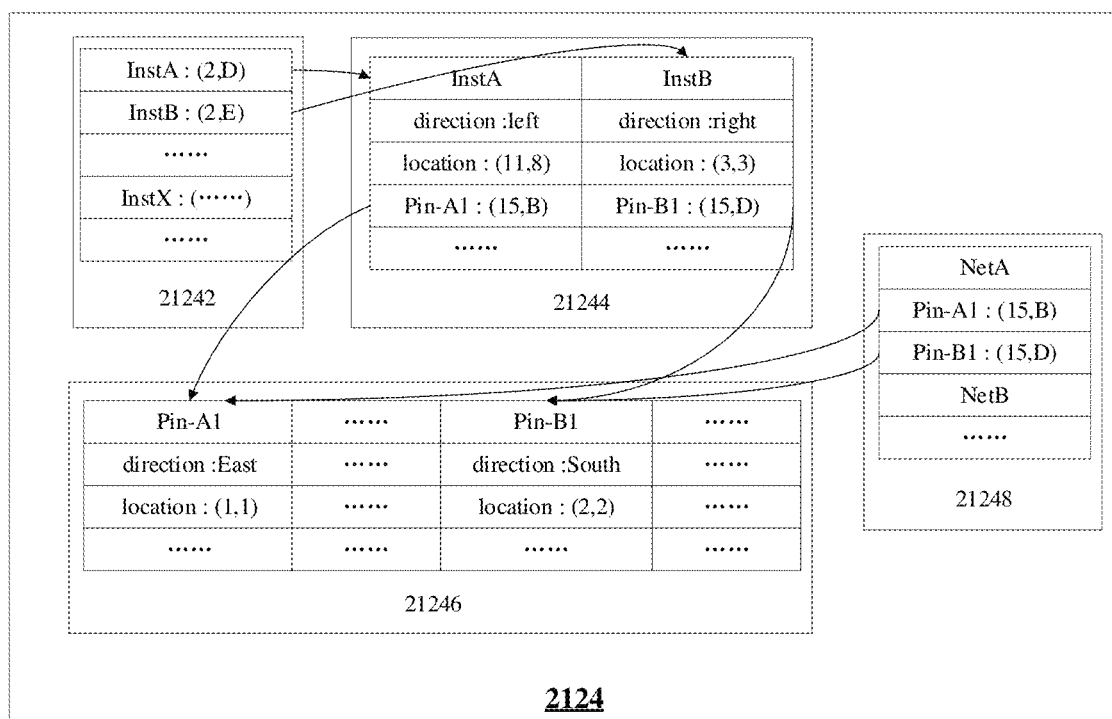
FIG. 2C illustrates a detailed schematic diagram of the module 2124 of the database system 212 according to an embodiment of the present application.

FIG. 2C shows a detailed schematic diagram of module 2124 of the database system 212 according to an embodiment of the present application.

As shown in FIG. 2C, the data of the Place calculation module 206 is stored in the memory block 21242, the data of Inst components is stored in the memory block 21244, the Pin data is stored in the memory block 21246, the Net wire data is stored in the memory block 21248, and these memory blocks are located dispersedly in the system memory area.

As shown in FIG. 2C, exemplary information to be calculated by the Place calculation module 206 is shown in module 21242. The information of Inst components (for example, InstA and InstB, as different types of gate circuits in module 2122 in FIG. 2A) and the information of corresponding pins (for example, Pin-A1 and Pin-B2) are stored in the memory blocks 21244 and 21246, respectively, of database system 212. There are logical relationships between the Inst components and the corresponding pins (for example, InstA owns Pin-A1, and InstB owns Pin-B2). In memory respective, their information stored in memory need to be mutually included and accessible. This was achieved in the form of "memory address/pointer". For example, as shown in FIG. 2C, the address of the memory block 21246 of the Pin data objects are recorded on the memory block 21244 of the Inst component, indicating that the current Inst component includes these Pin data objects.

Since the Place calculation module 206 needs to calculate the optimal positions of all components of the whole chip, the information of all the Inst components has to be stored in its own storage area. As mentioned above, this is achieved by recording the "address" of the memory block of the Inst component. As shown in FIG. 2C, in cases when the place calculation module 206 needs to read the location information of "InstA", the Place calculation module 206 will firstly locate the memory block 21244 of InstA according to the recorded address-"(2, D)", then read the location of the InstA therein, which is (11, 8). For more complicated cases where the Place calculation module 206 needs to read the location information of a certain pin Pin-A1 in the InstA. At this time, after the Place calculation module 206 have located into the memory block 21244 of InstA, it needs to further read the memory address of Pin-A1, that is, (15, B), and then locate into the memory block 21246 of Pin-A1, from which the location of Pin-A1 is read as (1,1).

The above shown method of pointer-based (that is, a direct physical address-based) data object access and dereferencing has been widely used in traditional EDA software. From the perspective of coding, this data accessing method is concise and intuitive, and the schematic coding form is (accessing the first-level attribute of data):

DataPointer→GetAttr().

Here, "→" proxies a calling process to a custom command that consumes one computer instruction cycle at best. If you need to access a secondary sub-attribute of the data, the coding form is:

DataPointer→GetAttr()→GetSubAttr().

In this case, at least two computer instruction cycles are required.

Although it has the advantage of conciseness and intuition from the perspective of coding, the way of direct indexing of physical addresses has its inherent drawbacks.

Firstly, this way has poor security and stability. It is easy to cause memory overflow, resulting in the crash of the entire software. During data access, if the data pointer fails for some reason (for example, the in-memory data itself has been destroyed, but the data pointers cached by the user are not destroyed simultaneously), the process of accessing the data will lead to unpredictable serious consequences, such as unconditional crash and exit of the program. This problem is particularly serious in VLSI designs. Imagine that the calculation, which has been running for days or even weeks, has to start all over again because of a software crash.

Secondly, the data is volatile. The memory pointer stores the storage location of the data object in the random access memory (RAM). RAM is characterized by loss of information after a power off, that is, when the program is interrupted and exits and then restarts for some reason (for example, unexpected computer shutdown due to power-off, or designed interruption and intemediate-data storage), all data pointers in the program will fail. Therefore, the intermediate state of the long time-consuming calculation process cannot be interrupted and saved to the external storage, and each calculation needs to be loaded from the beginning, and cannot be continued from the intermediate state of the previous calculation (that is, the program cannot continue the calculation based on the result of the previous calculation, and can only re-import all data and update the data pointer, and perform the calculation from the beginning). This is also a factor that seriously lengthens the design cycle in VLSI designs.

Thirdly, there is an access efficiency problem. This problem is particularly acute when multiple-level sub-attributes of the data need to be accessed. For example, if the average time it takes to access a data attribute once is defined as $\Delta t$, then the average time it takes to access an n-level data sub-attribute is $n \times \Delta t$.

In order to solve the above problem of the direct indexing of physical addresses, the reference and access to the data object may be implemented in a manner based on a "unique identification number" (referred to as ID) (this is referred to below as the soft address indirect index).

In fact, the pointer (i.e., physical memory address) of the data object in the conventional manner can also be understood as a unique identification number. But it differs from the ID described here in that, in the way of direct indexing of physical addresses, the database stores the location of the data object in memory while creating the data object in memory, and then uses the location as a memory pointer, which is in a one-to-one corresponding relationship with the physical storage location of the data object. Once the storage location of the data object in memory changes (for example, a restart after a power off results in a memory address change), the previously loaded memory pointer (data reference) is invalidated. As a result, in the traditional way of direct indexing of physical addresses, each computing process or calculation module has to reload data after each power off and restart, but cannot restart and continue computation based on the intermediate state of the last calculation (before the power off). However, the ID-based method removes the direct association between ID and the physical storage location of the data object in memory, and ID is only associated with the data object itself.

Figure 3A:
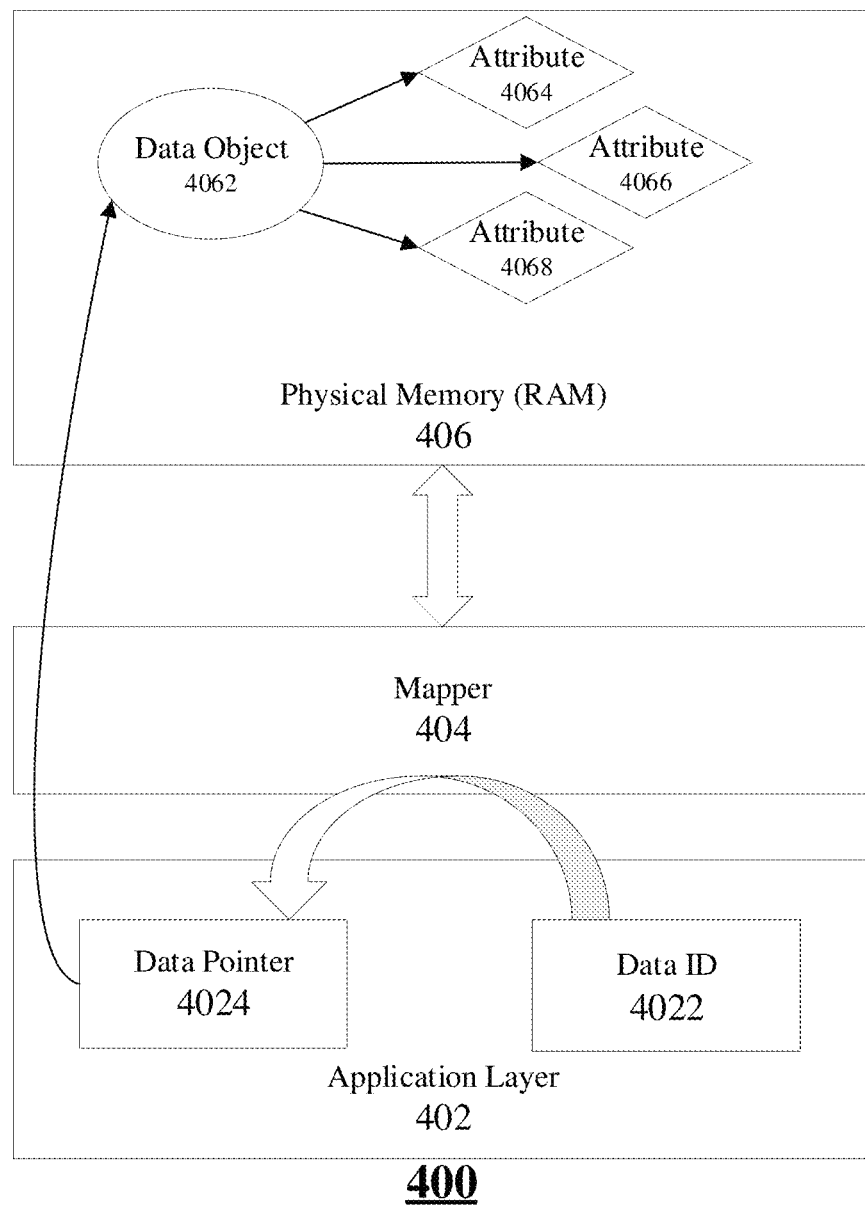
FIG. 3A illustrates a schematic diagram of an ID-based data access approach according to an embodiment of the present application.

FIG. 3A shows a schematic diagram of an ID-based data access approach 400 according to an embodiment of the present application.

As shown in FIG. 3A, the ID-based data access method is generally divided into the following steps.

Firstly, the database creates all the data objects (including a data object 4062), stores them in memory 406, and assigns them unique integer-type ID numbers. The ID is used as a reference to the data.

Then, the database user stores the data ID obtained from the database in its own temporary storage area as its data reference. When the application layer 402 needs to access the corresponding data object, the queried data ID 4022 of the data object is acquired from the temporary storage area, the ID is then translated into a data pointer (pointing to the storage address of the data in memory) 4024 using the ID mapper 404, and the data object 4062 is accessed in a conventional pointer mode based on the data pointer 4024.

Accordingly, if an attribute 4064, 4066, or 4068 of the data object 4062 needs to be further accessed, the attribute is further looked up.

It can be seen that the database user stores the data ID in the temporary storage area thereof, and the ID reference saved by each calculation module does not change when the computer is powered down or interrupted, thus some of the intermediate data in the calculation continues to be valid before and after the computer is restarted, and the calculation process may continue after the restart based on the result of the last calculation, so that the data volatility is overcome, which lays a foundation for realizing the interruption and restart of any intermediate state in each calculation process. On the other hand, since each calculation function and module indirectly indexes/accesses the data object stored in the physical memory through the ID mode, the problem of memory overflow due to an invalid pointer in the process of direct physical address accessing can be avoided, and the resulting unpredictable software crash can be avoided. This will greatly improve the overall stability of the software, and speed up the iterative cycle of chip design.

However, ID-based soft address indexing also causes new problems and can become a performance bottleneck if they are not addressed well.

Firstly, the complexity of the software is increased, which is mainly reflected in two aspects.

In the infrastructure layer (i.e., the database system itself), an additional complete set of ID conversion and indexing subsystem (an ID mapper 404) is needed to realize the conversion and mapping from ID to the physical address, management of the ID value of the data object, memory assignment and other functions. In the application layer (i.e., each calculation module) 402, it is necessary to convert the code implementation from "direct access or invoking of a data object and various attributes thereof based on a pointer" to "access of the data object based on an ID".

From the perspective of coding, this method needs an additional operation over the way of direct indexing of physical addresses. That is, the ID is converted into a pointer through the ID mapper. The schematic coding form is as follows:

IdMapper→GetDataPointer(id)→GetAttr().

If it is necessary to access a sub-attribute of the data, the form is:

IdMapper→GetDataPointer(id)→GetAttr()→GetSubAttr().

Obviously, this way increases the coding complexity.

Secondly, this way has poor safety and stability. Since database users still need to read, store and operate the data pointer in the temporary storage area, they will face the same problem as the traditional pointer mode.

Thirdly, computation is time-consuming and access efficiency is low. Due to the extremely high computation density, the same data object will be accessed repeatedly in the whole computation process of the chip, which requires a high speed in each indexing and locating process. In the traditional way of direct indexing of physical addresses based on pointers, this process is typically completed in one computer instruction cycle. In comparison with the traditional pointer mode, in a soft address indirect index mode based on ID, accessing the data requires an additional ID-to-pointer mapping/conversion process. This process typically requires a number of computer instruction cycles. In VLSI designs, such high-frequency while low-efficiency data indexing and locating process will become a performance bottleneck. For example, in a second-generation database system (such as OpenDB), the typical locating time is at least four times that of the conventional approach. It specifically includes the following four steps (each step requires at least one computer instruction cycle and it takes at least four instruction cycles in total): 1) extracting a base address number from the ID; 2) calculating a base address from the base address number; 3) extracting the offset address from the ID; 4) the base address and the offset address are combined into the final physical address. Each of these steps requires at least one computer instruction cycle and a total of at least four instruction cycles.

Taking the ID-based data access scheme shown in FIG. 3A as an example, one ID mapper 404 stores a certain type of data object, and different data objects correspond to different ID mappers.

As we know, the memory, as a common resource of the whole computer, is limited, and needs to be allocated for all the executing programs running on the computer. Each memory allocation process has a limitation on the amount of the assigned memory. If more memory is required, it has to be connected by a number of discrete small memory fragments.

Due to the limitation to this memory allocation size, in the second-generation database system (such as OpenDB), the entire ID mapper has to be divided into multiple pages (Page).

Figure 3B:
FIG. 3B illustrates a schematic diagram of an exemplary ID mapper according to an embodiment of the present application.

FIG. 3B shows a schematic diagram of an exemplary ID mapper 404 in accordance with an embodiment of the present application.

As shown in FIG. 3B, one mapper 404 is divided into a plurality of pages, for example, pages 4042, 4044, 4046, and 4048. Each page (e.g., page 4042, 4044, 4046, or 4048) is a contiguous memory that can store several data objects. For example, the data object 1-6 is stored in page 4042, the data object 7-12 is stored in page 4044, and data object 13-18 is stored in page 4046, and the data object 19-24 is stored in page 4048. The different pages are linked together to form a complete ID mapper 404.

For example, if a data object is in the m-th line on the n-th page, and each page has c data objects, its ID value is calculated in accordance with the following calculation equation:

$$ID = c \times (n-1) + m.$$

Calculating the address of the data object according to the ID is a reverse process of the above process, and the specific steps are as follows:

1) extracting a base address number (the number n of the page where the data object is located) from the ID;

2) calculating a base address (i.e., the address of the page where the data object is located) from the base address number;

3) extracting the offset address (the address of the m-th line on the page on which the data object resides) from the ID;

4) the base address and the offset address are combined into the final physical address.

Each of these steps requires at least one computer instruction cycle and a total of at least four instruction cycles is needed. In the pointer mode, this same process requires only one computer instruction cycle. As can be seen, compared to the way of direct indexing of physical addresses, each data access here increases the time overhead of "converting an ID to a pointer from an ID mapper". The more frequently data is accessed, the worse the performance drag will be. The memory paging of the ID mapper in OpenDB is an important reason for its low conversion efficiency.

In view of this, an embodiment of the present application provides a method for constructing database model with ID-Based data indexing-enabled data accessing, which can improve data access efficiency.

Figure 4A:
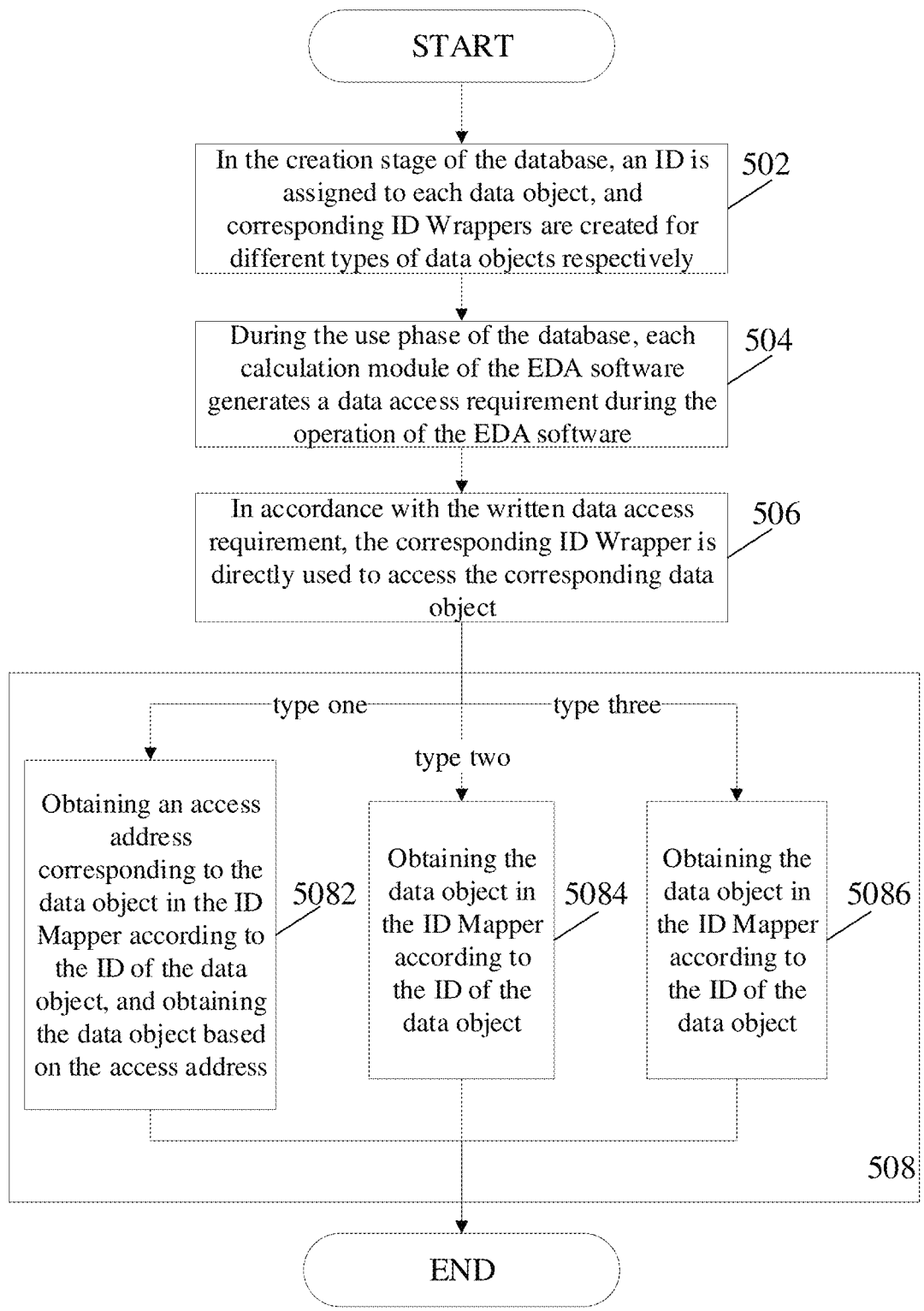
FIG. 4A illustrates a schematic diagram of an exemplary method provided by an embodiment of the present application.
Figure 4B:
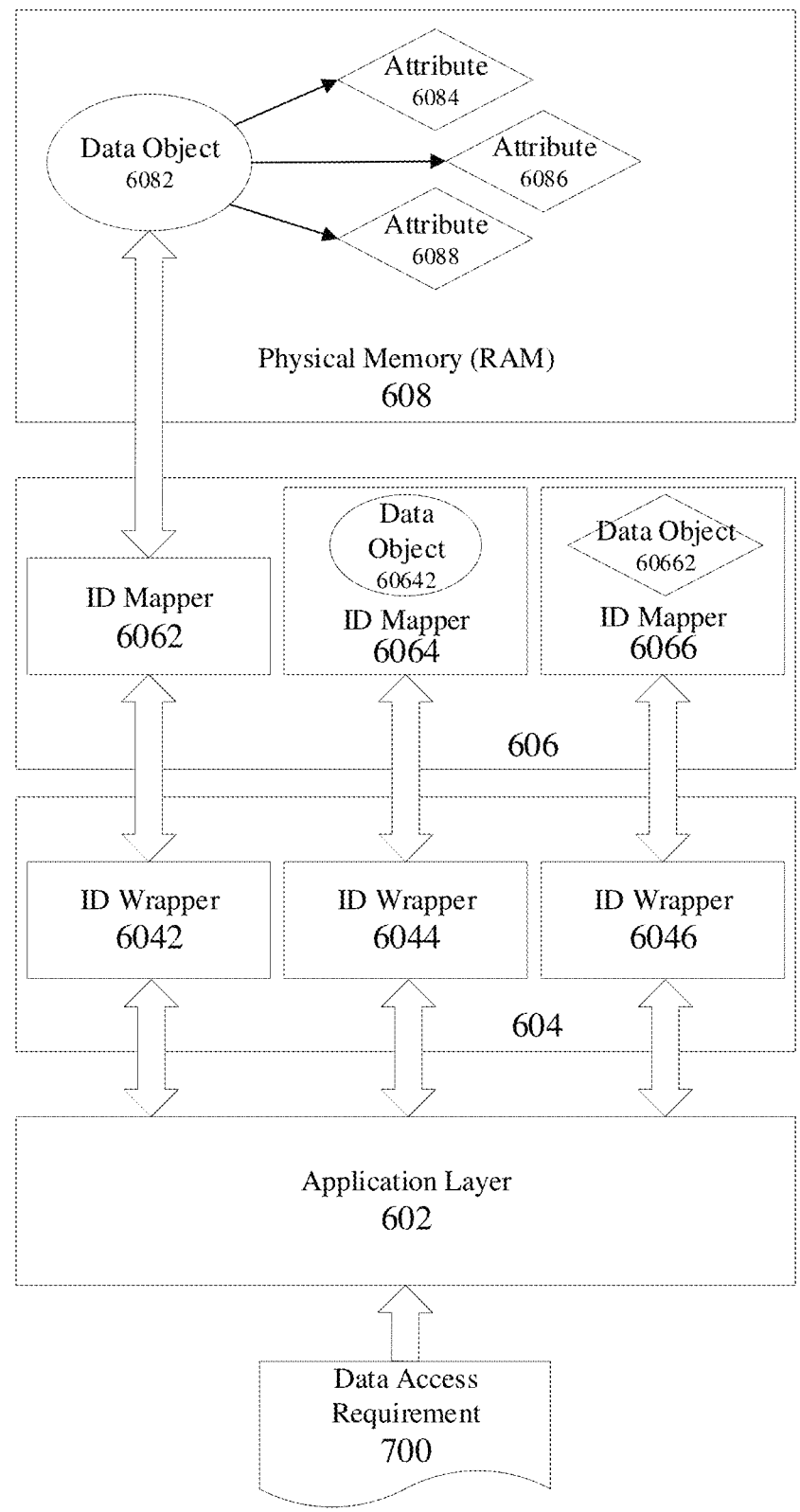
FIG. 4B illustrates a schematic diagram of a data access architecture according to an embodiment of the present application.

FIG. 4A illustrates a schematic diagram of an exemplary method 500 provided by an embodiment of the present application. FIG. 4B illustrates a schematic diagram of a data access architecture/database model 600 according to an embodiment of the present application. The method 500 may be executed by the device 100 in FIG. 1 and relies upon the data access architecture/database model 600 shown in FIG. 4B in the execution. The data access architecture/database model 600 may include an application layer 602, a database user's temporary storage area 604, a data mapping space 606, and a database creator's physical memory 608. When the temporary storage area 604, the data mapping space 606 and the physical memory 608 of the database creator are on the same device, they are all in the memory of the device and each of them is assigned a separate memory space.

As shown in FIG. 4A, the method 500 may include the following steps.

In step 502 (the creation phase of the database), a database can be created, including: assigning an ID to each data object and creating corresponding ID Wrappers for different types of data objects respectively.

In some embodiments, the ID Wrapper may be created by the creator of the database. According to the characteristics of different data object types, the database creator can create different ID Wrappers for different data types respectively, that is, each data object type has a customized ID Wrapper. The creation of the ID Wrapper is mainly divided into two steps: 1) define the original ID of the data object contained in the ID Wrapper. 2) define the custom command (data access instruction) for efficient data access through the original ID according to the characteristics of the data object. This custom command varies depending on data object type that is being accessed. In some embodiments, the database creator may program the custom command according to the actual situation so that the target data object is accessed in an optimal approach described by the custom command. The optimal approach may be a new way to achieve efficient data access that appears with the passage of time and technological development, or may be an approach to achieve efficient data access for a specific data type, etc. Therefore, the custom command allows the database creator to design a customized and efficient data access approach so that various types of data in the database can be accessed efficiently.

The ID Wrappers, as an index to the data object, can be copied and stored directly in the memory of the database user; a corresponding ID is stored in the ID Wrapper, which is used for identifying the indexed data object; while the method of accessing the corresponding data object according to the ID is software-encoded in the ID Wrapper, whose software encoding rule includes but not limited to: if the data object is of type one, first obtain the corresponding access address of the data object from the ID-mapper according to the ID of the data object, then obtain the data object based on that access address; or, if the data object is of type two or type three, obtain the data object directly from the ID-mapper according to the ID of the data object.

In step 504, the process enters the usage phase of the database, the device 100 may run the EDA software, and the calculation modules of the EDA software may generate a wide variety of data access requirements 700 during the running of the EDA software by the device 100. For example, the user may input a command desired to be executed through a command interface or a graphical interface provided by the Tcl command module 204 of the simulation tool 200 shown in FIG. 2. The tasks specified by the command are parsed by the Tcl command module 204 and are distributed to the calculation modules. When processing the command, the calculation modules generate a requirement for accessing the corresponding data, that is, the data access requirement 700.

In step 506, the device 100 may directly use a corresponding ID Wrapper for data access according to the data access requirement 700. The ID Wrapper includes an ID of the data object and methods of accessing the data object.

In the phase of system initialization, the database creator can create all data objects and store them in memory 608 and assign unique integer-type ID numbers to them. Different ID Wrappers are created depending on corresponding data object types, respectively. The original ID of the data object, as a part of the corresponding ID Wrapper, is stored as a private data member inside the ID Wrapper. Different types of data objects have different types of ID Wrappers. The application layer (or the calculation module) uses the ID Wrapper as a reference to the corresponding data object, as well as the access approach.

The database user may store the ID Wrapper obtained from the database in its own temporary storage area 604 as a reference to its data. As shown in FIG. 4B, the temporary storage area 604 of the database user may include ID Wrappers 6042, 6044, 6046. When the data access requirement 700 requires access to a certain type of data object, the device 100 can directly access the data object using the ID Wrapper corresponding to the data object that has been created at the stage of database creation.

In step 508, the device 100 may execute a data access instruction written based on the encoding rule in the ID Wrapper to access a desired data object. Execution of fast data access corresponding to the ID Wrapper relies on efficient ID conversion by the ID mapper. The ID mapper may, depending on the characteristics of the data itself, either map the ID to the data pointer, or the data object itself, or directly to a certain level of sub-attribute of the data object, so as to overcome the problem of low access efficiency of multi-level sub-attributes in the traditional pointer mode.

For example, in step 5082, if the data object is of type one, the device 100 may obtain an access address corresponding to the data object in the data mapping space 604 according to the identifier (ID) of the data object (for example, the memory pointer of the data object is obtained from the ID in the ID Mapper 6062), and then obtain the data object (such as the data object 6082) from the physical memory 608 based on the access address (memory pointer). In some embodiments, upon obtaining the data object 6082, its attributes 6084, 6086, 6088 may be further obtained.

In some embodiments, for type-one data object, the ID Mapper 6062 may use a structure similar to a one-dimensional array to store the correspondence of the data ID to its pointer (which for example may be obtained from the physical memory 608 at the time of system initialization and may be loaded into data mapping space 606 for invocation by the ID Mapper 6062), while the specific data object is stored in a memory pool of the physical memory 608.

It can be seen that memory paging can be avoided by using the data access mode in step 5082. The reason is that the memory size of each pointer is small (8 bytes on a 64-bit system). Therefore, even for a certain type of data object with a total number of millions, the continuous memory space required for storing pointers is only about 8M, and there is no need to page the memory, which is feasible. In this mode, the ID can be converted to a pointer in the ID Wrapper 6042 using the following command:

DataPointer=IdMapper[id].

Here, [] represents a subscript addressing operation of a one-dimensional array, which typically consumes one computer instruction cycle. This mode is applicable to cases where a single data object has a large memory size. Thus, in some embodiments, type one may be a data type in which the data size of the data object is greater than the first threshold (e.g., 100 bytes). In some embodiments, the access frequency of type-one data object may be above a frequency threshold.

For another example, in step 5084, if the data object is of type two, the device 100 may directly obtain the data object (such as the data object 60642) in the data mapping space 606 (such as the ID Mapper 6064) according to the identifier (ID) of the data object by using the ID Wrapper 6044.

In some embodiments, for data objects of type two (for example, for the data objects with small memory size), each element of the one-dimensional array in the ID Mapper 6064 holds an entire data object. ID conversion efficiency can be improved by avoiding memory paging as well because the data object has small memory size. In this mode, the ID can be converted to the data object itself in the ID Wrapper 6044 using the following command:

DataObject=IdMapper[id].

Unlike the data access in step 5082, the entire data object itself, not the data pointer, can be accessed via the ID in step 5084. The advantage lies in that the data access efficiency can be further improved by effectively utilizing the cache mechanism of the computer. As we all know, the computer's caching mechanism loads a contiguous region (i.e., the data object being accessed) of the memory it accesses into the cache. Thus, in some embodiments, the method 500 may further comprise: in response to the data object being of type two and the access frequency being above the frequency threshold (such as 1000 times/second), the device 100 may load the data object into the cache of device 100 such that the data object may be obtained from the cache. In this way, the device 100 can read data directly from the cache when subsequently accessing the same data object, which will further improve the access efficiency compared to accessing data from memory. In the pointer mode, the pointer always points to a location in memory and the data has to be read from memory, making this caching mechanism unavailable. This approach is therefore particularly suitable for high-frequency repeated access to a large number of simple data objects.

In some embodiments, type two may be a data type in which the data size of the data object is smaller than a second threshold (such as 50 bytes), which is smaller than or equal to the aforementioned first threshold. In some embodiments, the access frequency of type-two data object is above a frequency threshold (such as 1000 times/second).

For another example, in step 5086, if the data object is of type three, the device 100 may directly obtain the data object in the data mapping space 604 according to the ID of the data object by using the ID Wrapper 6046. In some embodiments, type-three data object is data that requires multiple access levels, e.g., multi-level sub-attribute data.

In some embodiments, the multi-level sub-attributes of some high-frequently accessed data objects may be extracted from the original data objects and stored separately in the ID Mapper 6066. In this way, the device 100 can directly access the multi-level sub-attribute data of the data object according to the ID of the original data object without having to access the multi-level sub-attribute data one level by one level through the raw data object itself. In this step, the caching mechanism of the computer can also be fully utilized to further improve the data access efficiency. Thus, in some embodiments, in response to the data object being of type three and the access frequency being above the frequency threshold, the data object is loaded into the cache of device 100 such that the data object is obtained from the cache.

Take accessing to a two-level sub-attribute as an example, the data access process of: the traditional mode of direct indexing by physical addresses, the original ID mode, and the new access mode provided in step 5082, and the new access mode provided by the step 5086 are sequentially listed and compared as follows:

1) the traditional pointer mode: DataPointer→GetAttr()→GetSubAttr();

2) the original ID mode:

IdMapper→GetDataPoint(id)→GetAttr()→GetSubAttr();

3) the mode in step 5082: IdMapper[id]→GetAttr()→GetAttr();

4) the mode in step 5086: IdMapper[id].

From the above, it can be seen that the approach of step 5086 requires the least number of data access steps and has the highest access efficiency. Compared with the pointer mode, the approach of step 5086 can also make use of the computer caching mechanism to further improve the access efficiency. As the number of sub-attribute objects is larger, the access frequency is higher and the access level is deeper, the performance advantage is more obvious.

Thus, in some embodiments, data object of type three is the data object whose access frequency is higher than a frequency threshold and whose data type is actually attribute data.

As can be seen from the above embodiments, the method 500 proposed in the present application has three basic modes of operation, in all of which only address pointers or simple data objects (or attribute objects) with small memory size are stored in the mapper, thus the total memory size is small, allowing usage on only a small piece of continuous memory space to perform the storage, thus avoiding the performance problem caused by memory paging.

The method 500 proposed by the present application has at least the following advantages:

1) From the perspective of coding, the ID Wrapper has the same concise programming form as the traditional pointer mode:

IdWrapper→GetAttr().

If it is necessary to quickly access each level of sub-attributes of the data, the form is more concise than the pointer mode:

IdWrapper→GetSubAttr().

2) Safety and stability. The object that the user side reads, stores and operates is an ID Wrapper, not a pointer, thus effectively avoiding the problem of operating an invalid pointer.

3) Data volatility has been overcome.

4) High data access efficiency. The ID Wrapper allows custom and efficient data access commands to be programmed in the software coding phase, and an efficient process of data access to be programed according to the characteristics of different types of data. The ID Wrapper can be viewed as mirrored conterpart of the data objects in the physical memory 608 at the application layer 602, through which the data object and its various levels of sub-attributes can be accessed directly and quickly. This method not only combines the advantages of both the pointer and the ID, but also effectively avoids their respective disadvantages, making it possible to further improve the efficiency of data access.

In some embodiments, the device 100 may launch a corresponding ID Wrapper to execute the following steps:

For example, based on the ID of the data object, the device 100 may convert the ID into a memory address corresponding to the data object in the data mapping space in accordance with a preset calculation rule, and obtain the data object based on the memory address. Thus, for the data objects that are not categorized into type one, type two and type three, they may be accessed in an original ID-based manner.

In another embodiments, the device 100 may run a corresponding ID Wrapper to execute the following steps:

Based on the data object itself, the device 100 may obtain a memory address corresponding to the data object in the data mapping space, and obtain the data object based on the memory address. Thus, for the data objects that are not categorized into type one, type two and type three, the data may also be accessed using the traditional way of direct indexing of physical addresses.

In some embodiments, a custom command for counting the frequency of data access may be added to the ID Wrapper, such that the device 100 may invoke the ID Wrapper to count the data access frequency of each data object type within a given period, based on which to determine the new data types and new data access methods needed to be added in the ID Wrapper; meanwhile, such access frequency information may also provide us more debug information for debugging purposes. In this way, it helps to analyze the data access characteristics of different data types, providing us the reference for further system optimization.

Figure 5A:
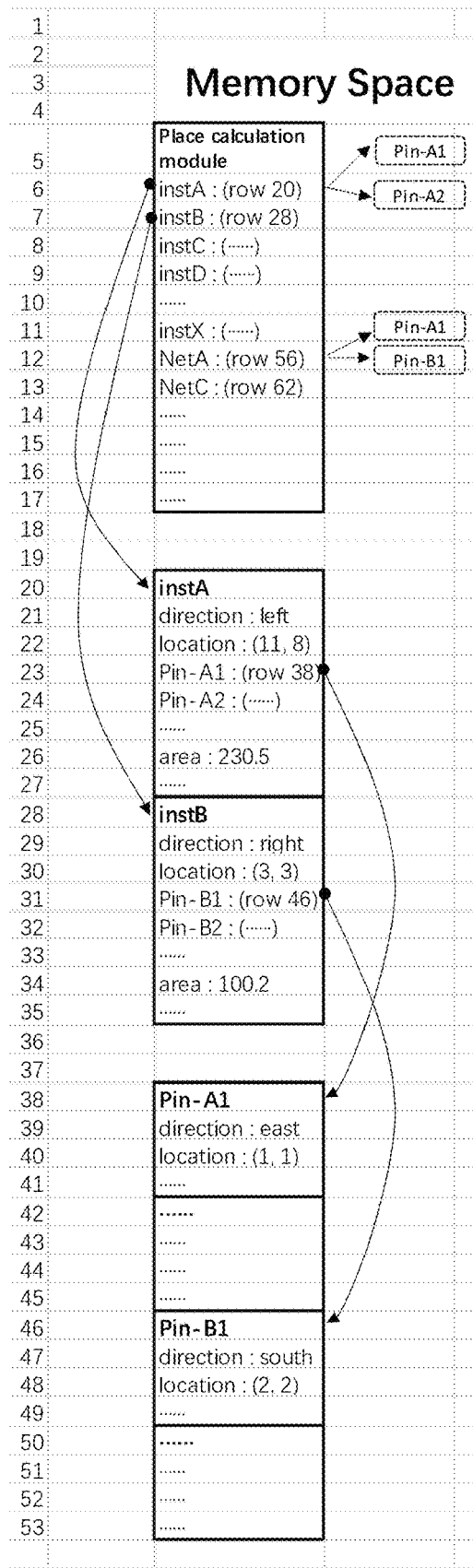
FIG. 5A illustrates a schematic diagram of conventional pointer-based data access approach according to an embodiment of the present application.
Figure 5C:
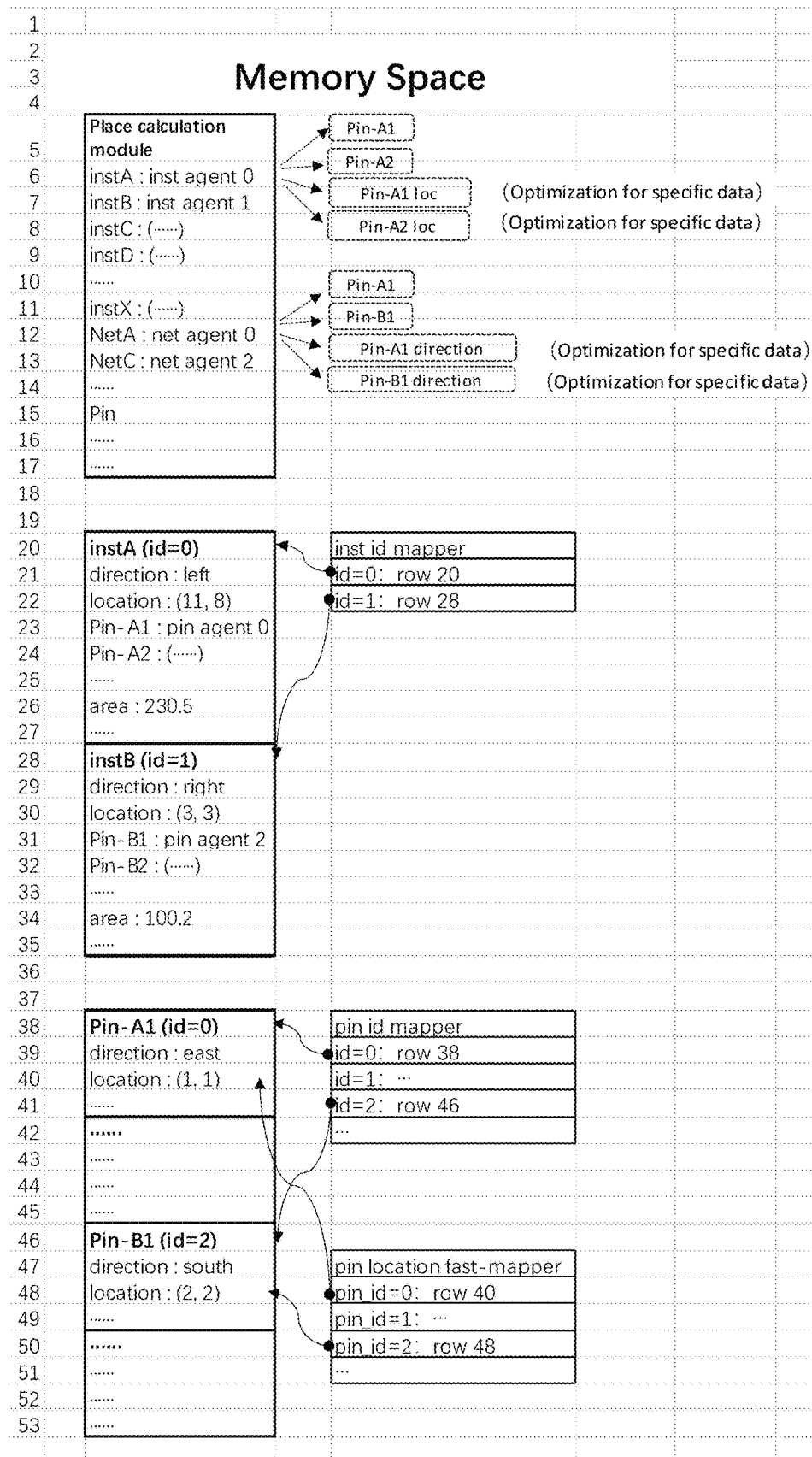
FIG. 5C illustrates a schematic diagram of an ID-based data access approach of an ID-wrapper according to an embodiment of the present application.

Next, we compare the data access processes between the traditional pointer mode, the OpenDB mode and the mode provided by the method 500, as shown in FIGS. 5A to 5C. Illustration is given by taking "During the calculation of the do_place task, the Place calculation module needs to read the location information of a pin Pin-A1 of the component InstA" as an example.

As shown in FIG. 5A, in the traditional pointer mode, the memory addresses of memory blocks (such as the memory block corresponding to the 20-th to the 35-th lines) to which different data objects (such as InstA) belong are recorded in the memory block of the Place calculation module; and the addresses of memory blocks (such as the memory block corresponding to the 38-th to the 53-th lines) to which the sub-attributes (such as Pin-A1) belong are stored in the same way in the memory block of each data object (such as the memory block corresponding to the 20-th to the 35-th lines). In the view of the pointer user, the approach of data reading is as follows: "Read the memory address of InstA in the memory block of the Place calculation module→Locate the memory block to which InstA belongs→Read the memory addresses of pin-A1→Locate the memory block to which pin-A1 belongs→Read the location to pin-A1 as (1, 1)". The core characteristics of this mode is that the data object in memory are referred to or represented as "memory address" (memory address-based data reference). When the addresses of various colored memory blocks change in the memory for some reason, the corresponding data reference address is not updated synchronously. Therefore, this data reference method has the following defects: 1) easy to cause memory overflow, resulting in the crash of the entire software; 2) volatile data.

In order to overcome the above-mentioned problems, OpenDB changes the manner of "recording the address of the memory block to which the data object belongs" to the manner of "recording the ID of the data object". Thus, the IDs of various memory blocks remain unchanged even if their corresponding addresses in memory are changed. As a result, the recorded data reference (ID-based data reference) does not fail. However, we cannot use the ID to directly find the memory block to which the corresponding data object belongs. Therefore, the ID needs to be converted to the address of the corresponding memory block. This process is completed by a certain calculation (as shown in the middle column of FIG. 5B), and its basic calculation principle is: Physical address=base address+offset address. Here, both base and offset are calculated from the ID. After the address of the memory block to which the data object belongs is calculated, the data can be accessed according to the traditional pointer mode. In the view of the ID user, the basic approach of data reading is as follows: "Read the ID of InstA in the memory block of the Place calculation module→Convert the ID by calculation to the memory address of InstA-→Locate to the memory block to which InstA belongs-→Read the memory addresses of pin-A1→Locate to the memory block to which pin-A1 belongs→Read the location to pin-A1 as (1, 1)". The key points of this mode are: 1) Using ID-based data reference mode instead of memory address-based data reference mode overcomes the problem of data volatility. 2) Memory overflow and software crash cannot be effectively overcome since data pointers are not hidden to user. 3) Conversion from the ID to the address requires an additional computation process, which reduces the data access speed. 4) The additional conversion from the ID to the address complicates the data access process.

In order to overcome the 2), and 3) problems described above, the method 500 employs the mode "Based on ID wrapper and ID mapper". In this mode, the data object in memory is referenced based on neither "memory address" nor "data ID," but on "ID Wrapper" (such as inst_agent_0). Using this architecture, the ID Wrapper can perform the conversion operation from the ID to the memory address, finish data access process to the data object and its sub-attributes on behalf of the ID user in a hidden way. In the view of the ID user, the basic approach of data reading is as follows: "Read instA's ID agent inst-agent-0 (ID Wrapper) in the memory block of the Place calculation module→Read the location to pin-A1 as (1, 1) through the ID agent". There are several advantages: 1) the data pointer has been successfully hidden, effectively overcoming memory overflow and software crash. 2) The data access process that the ID Wrapper performs is concise and intuitive (such as $inst_{agent_0} \rightarrow GetPin\text{-}A1()$, similar to the traditional pointer mode. 3) The ID Wrapper internally takes over and acts as agent for the data access, which can be optimized based on specific data types, thus improving the access efficiency. For example, the location information to the pin Pin-A1 is directly accessed through $inst_{agent_0} \rightarrow GetPin\text{-}A1\text{-}Location()$ without a multi-level locating process of "inst→Pin-A1 and Pin-A1→location" as in the traditional pointer mode.

Inside the ID Wrapper, a fast conversion from the ID to the data pointer can be achieved through different policies and modes.

In one mode, the ID Mapper stores the correspondence between the ID and the data pointer. When the ID user uses the ID Wrapper (such as inst-agent-0) to access the data attribute (such as pin-A1), we convert the ID (such as 0) to the data pointer (such as row 20) inside the ID Wrapper through the ID Mapper and locate to the corresponding memory block (such as the memory block corresponding to the 20-th to the 35-th lines in FIG. 5C), so that the corresponding data attributes (such as pin-A1) are read and returned to the user of the ID Wrapper. The ID-to-pointer conversion process described above takes one computer instruction cycle and is superior to OpenDB's calculation-based conversion process.

In addition, if certain data type (such as the pin location) has a particularly high access frequency, a separate ID mapper (such as a pin location fast-mapper) can specifically be created for such data. Thus, in the internal ID conversion process, the memory address of the pin location can be directly mapped through the ID, and the basic flow of data reading is as follows: "Map the ID directly to the memory address of the location attribute of the pin pin-A1 of instA through fast-mapper→Locate to row 40 in the corresponding memory block and directly read the location information of pin-A1". This process does not need to go through the multi-level locating process of "inst→Pin-A1 and Pin-A1→location", thus further improving the data access speed.

As can be seen from the above, the method for constructing database model with ID-Based data indexing-Enabled data accessing, which is provided by the present application and applied to EDA software, utilize the concept of the ID Wrapper to overcome the problems in data access. In this application, the ID Wrapper and the ID Mapper are combined to customize efficient data access methods in various modes for different data types according to their specific characteristics. In contrast to the traditional pointer mode and the original ID mode, the present application not only retains the advantage of ID-based data access (security, stability, data persistence), but also has a more concise form of data access and higher data access efficiency.

It should be noted that the method of the embodiment of the present application may be performed by a single device, such as a computer or a server. The method of the embodiment can also be applied to a distributed scenario, and is implemented by a plurality of devices cooperating with each other. In the case of such a distributed scenario, only one device of the plurality of devices may perform one or more of the steps of the method of the embodiment of the present application, and the plurality of devices interact with each other to accomplish the method.

It should be noted that some embodiments of the present application have been described above. Other embodiments fall within the scope of the appended claims. In some cases, the actions or steps recited in the claims may be performed in a different order from those in the above embodiments and still achieve the desired results. In addition, the processes depicted in the drawings do not necessarily require a particular order or a sequential order shown in order to achieve the desired results. In some embodiments, multi-tasking and parallel processing may also be possible or may be advantageous.

Based on the same inventive idea and correspondingly to the method of any of the above embodiments, the present application further provides a non-transient computer-readable storage medium that stores computer instructions used to cause the computer to execute the method 500 as described in any of the above embodiments.

The computer-readable medium of the present embodiment includes permanent and non-permanent, removable and non-removable media, which can realize the information storage in any method or technique. The information can be computer-readable instructions, data structures, program modules or other data. An example of the computer storage medium includes, but not limited to, a phase change memory (PRAM), a static random access memory (SRAM), a dynamic random access memory (DRAM), other types of random access memory (RAM), a read-only memory (ROM), an electrically-erasable programmable read-only memory (EEPROM), a flash memory or other memory techniques, a compact disk read-only memory (CD-ROM), a digital versatile disc (DVD) or other optical storages, magnetic cassette tapes, magnetic diskettes or other magnetic storage device, or any other non-transmission medium, which can be used for the storage of information accessible to a computing device.

The computer instructions stored in the storage medium of the above embodiments are used to cause the computer to execute the method 500 as described in any of the embodiments, and have the advantageous effects of the corresponding method embodiments, which will not be described here.

Based on the same inventive idea and correspondingly to the method of any of the above embodiments, the present application further provides a computer program product, which includes a computer program. In some embodiments, the computer program is executable by one or more processors to cause the processors to execute the method 500. Corresponding to the execution subject corresponding to each step in each embodiment of the method 800, the processor executing the corresponding step may belong to the corresponding execution subject.

The computer program product of the above embodiments is used to cause the processor to perform the method 500 as described in any of the embodiments, and have the advantageous effects of the corresponding method embodiments, which will not be described here.

Those ordinarily skilled in the art will appreciate that the discussion of any of the above embodiments is exemplary only and is not intended to imply that the scope of the present application, including the claims, is limited to these examples. Under the idea of the present application, the technical features in the above embodiments or different embodiments may also be combined, and the steps may be implemented in any order, and there are many other variations of the various aspects of the embodiments of the present application described above which are not provided in detail for the sake of brevity.

In addition, to simplify the description and discussion, and in order not to obscure the embodiments of the present application, well-known power/ground connections to integrated circuit (IC) chips and other components may or may not be shown in the accompanying drawings provided. Furthermore, the device may be shown in a block diagram form in order to avoid making the embodiments of the present application difficult to understand, and this also takes into account the following facts, i.e., the details regarding the embodiments of these block diagram devices are highly dependent on the platform on which the embodiments of the present application are to be implemented (i.e., these details should be well within the understanding of those skilled in the art). Where specific details (e.g., circuit) are set forth to describe exemplary embodiments of the present application, it will be apparent to those skilled in the art that, the embodiments of the present application may be practiced without these specific details or with changes in these specific details. Accordingly, these descriptions are to be considered illustrative and not restrictive.

Although the present application has been described in connection with specific embodiments of the application, in light of the foregoing description, many substitutions, modifications, and variations of these embodiments will be apparent to those ordinarily skilled in the art. For example, other memory architectures, such as dynamic RAM (DRAM), may use the embodiments in question.

The embodiments of the present application are intended to cover all such substitutions, modifications, and variations that fall within the broad scope of the appended claims. Therefore, any omissions, modifications, equivalents, improvements, etc. made within the spirit and principle of the embodiments of the present application are intended to be included within the protection scope of the present application.

What is claimed is:

1. A method for data indexing based on ID and for constructing an accessed database model, applied to EDA software, comprising:
   in a creation stage of a database, assigning an ID to a data object, and creating an ID Wrapper for the data object; wherein the data object represents a physical entity of a VLSI design or a property of the physical entity; the ID Wrapper, as an index to the data object, can be copied and stored directly in a memory of a user of the database; the ID is stored in the ID Wrapper, and the ID is used for identifying the data object, and the method of accessing the data object according to the ID is software-encoded in the ID Wrapper, and the software programming rule of the ID Wrapper is: if a type of the data object is type one, acquiring an access address corresponding to the data object in an ID Mapper according to the ID of the data object, and acquiring the data object based on the access address; or if the type of the data object is type two or type three, then acquiring the data object in the ID Mapper according to the ID of the data object; wherein access addresses of type-one data objects and type-two data objects or type-three data objects are stored in a piece of continuous memory space of the memory of the user of the database;
   in a use stage of the database, each calculation module of the EDA software generating a data access requirement in the running process of the EDA software;
   directly using the ID Wrapper to access the data object according to the data access requirement, wherein the ID Wrapper comprises the ID of the data object and the method of accessing the data object; and
   executing a data access instruction written based on the programming rule in the ID Wrapper to access the data object;
   wherein, the type one is data having a data size of the data object being greater than a first threshold; the type two is data having a data size of the data object being smaller than a second threshold, and the first threshold is greater than or equal to the second threshold; the type three is data having an access frequency of the data object being higher than a frequency threshold and a data type requiring multi-level access.

2. The method according to claim 1, wherein the access frequency of the data object of the type one is higher than a frequency threshold; and the access frequency of the data object of the type two is higher than the frequency threshold.

3. The method according to claim 1, wherein the data object of the type three is attribute data.

4. The method according to claim 1, wherein the data access instruction in the ID Wrapper is a custom command, such that the data object is accessed in an approach described by the custom command.

5. The method according to claim 1, further comprising:
   in response to the type of the data object being data of the type two or the type three having an access frequency above the frequency threshold, loading the data object into the cache such that the data object is obtained from the cache.

6. The method according to claim 1, wherein a software programming rule of the ID Wrapper further includes:
   if the type of the data object is not the type one, the type two or the type three, converting the ID of the data object into an access address corresponding to the data object in the ID Mapper in accordance with a preset calculation rule, and obtaining the data object based on the access address.

7. The method according to claim 1, wherein a software programming rule of the ID Wrapper further includes:
   if the type of the data object is not the type one, the type two or the type three, obtaining an access address corresponding to the data object in the ID Mapper according to the data object, and obtaining the data object based on the access address.

8. The method according to claim 1, further comprising:
   counting the frequency of accessing the data object within a preset period; and
   determining a data type and/or a method in which the data object is accessed that needs to be added in the ID Wrapper based on the access frequency.

9. A computer device, comprising one or more processors, a memory and one or more programs, wherein the one or more programs are stored in the memory and when executed by the one or more processors, implement steps of the method according to claim 1.

10. A computer device, comprising one or more processors, a memory and one or more programs, wherein the one or more programs are stored in the memory and when executed by the one or more processors, implement steps of the method according to claim 2.

11. A computer device, comprising one or more processors, a memory and one or more programs, wherein the one or more programs are stored in the memory and when executed by the one or more processors, implement steps of the method according to claim 3.

12. A computer device, comprising one or more processors, a memory and one or more programs, wherein the one or more programs are stored in the memory and when executed by the one or more processors, implement steps of the method according to claim 4.

13. A computer device, comprising one or more processors, a memory and one or more programs, wherein the one or more programs are stored in the memory and when executed by the one or more processors, implement steps of the method according to claim 5.

14. A computer device, comprising one or more processors, a memory and one or more programs, wherein the one or more programs are stored in the memory and when executed by the one or more processors, implement steps of the method according to claim 6.

15. A computer device, comprising one or more processors, a memory and one or more programs, wherein the one or more programs are stored in the memory and when executed by the one or more processors, implement steps of the method according to claim 7.

16. A computer device, comprising one or more processors, a memory and one or more programs, wherein the one or more programs are stored in the memory and when executed by the one or more processors, implement steps of the method according to claim 8.

17. A non-transitory computer-readable storage medium having instructions recorded thereon which, when executed by one or more processors, causes the processor to execute the method according to claim 1.

18. A non-transitory computer-readable storage medium having instructions recorded thereon which, when executed by one or more processors, causes the processor to execute the method according to claim 2.

19. A non-transitory computer-readable storage medium having instructions recorded thereon which, when executed by one or more processors, causes the processor to execute the method according to claim 3.

20. A non-transitory computer-readable storage medium having instructions recorded thereon which, when executed by one or more processors, causes the processor to execute the method according to claim 4.

* * * * *